(12) United States Patent
Utagaki et al.

(10) Patent No.: US 7,828,892 B2
(45) Date of Patent: *Nov. 9, 2010

(54) INORGANIC BOARD AND A METHOD FOR THE MANUFACTURING THEREOF

(75) Inventors: Kazuo Utagaki, Nagoya (JP); Tatsuya Tsugawa, Nagoya (JP); Yoshitaka Doi, Nagoya (JP)

(73) Assignee: Nichiha Corporation, Nagoya-shi (JP)

( * ) Notice: Subject to any disclaimer, the term of this patent is extended or adjusted under 35 U.S.C. 154(b) by 498 days.

This patent is subject to a terminal disclaimer.

(21) Appl. No.: 11/661,719

(22) PCT Filed: Aug. 29, 2005

(86) PCT No.: PCT/JP2005/015667

§ 371 (c)(1),
(2), (4) Date: Feb. 28, 2007

(87) PCT Pub. No.: WO2006/025331

PCT Pub. Date: Mar. 9, 2006

(65) Prior Publication Data

US 2007/0245930 A1 Oct. 25, 2007

(30) Foreign Application Priority Data

Aug. 31, 2004 (JP) .............................. 2004-251706
Aug. 31, 2004 (JP) .............................. 2004-251707
Mar. 30, 2005 (JP) .............................. 2005-006131

(51) Int. Cl.
C04B 7/02 (2006.01)

(52) U.S. Cl. .................... 106/713; 106/716; 106/724; 106/737; 428/688; 428/703; 52/309.17

(58) Field of Classification Search ................ 428/688, 428/703; 52/309.17; 106/713, 716, 724, 106/737

See application file for complete search history.

(56) References Cited

U.S. PATENT DOCUMENTS

| | | | |
|---|---|---|---|
| 3,972,972 A | 8/1976 | Yano et al. | |
| 4,101,335 A | 7/1978 | Barrable | |
| 5,188,889 A | 2/1993 | Nagatomi et al. | |
| 5,858,083 A | 1/1999 | Stav et al. | |
| 5,945,044 A | 8/1999 | Kawai et al. | |
| 6,001,169 A | 12/1999 | Kawai | |
| 6,138,430 A | 10/2000 | Van Acoleyen et al. | |
| 6,506,248 B1 | 1/2003 | Duselis et al. | |
| 6,572,697 B2* | 6/2003 | Gleeson et al. ............. | 106/705 |
| 6,605,148 B2 | 8/2003 | Shirakawa et al. | |
| 6,676,745 B2 | 1/2004 | Merkley et al. | |
| 6,872,246 B2 | 3/2005 | Merkley et al. | |
| 7,344,593 B2 | 3/2008 | Luo et al. | |
| 7,621,087 B2 | 11/2009 | Utagaki et al. | |
| 2001/0047741 A1 | 12/2001 | Gleeson et al. | |
| 2003/0205172 A1 | 11/2003 | Gleeson et al. | |
| 2004/0168615 A1 | 9/2004 | Luo et al. | |
| 2005/0235883 A1 | 10/2005 | Merkley et al. | |
| 2006/0043627 A1 | 3/2006 | Sugita et al. | |
| 2006/0075931 A1* | 4/2006 | Utagaki et al. ............. | 106/677 |
| 2007/0186822 A1 | 8/2007 | Utagaki et al. | |
| 2007/0246864 A1* | 10/2007 | Utagaki et al. ............. | 264/333 |
| 2007/0261607 A1 | 11/2007 | Utagaki et al. | |
| 2008/0072795 A1 | 3/2008 | Utagaki et al. | |
| 2008/0072796 A1 | 3/2008 | Utagaki et al. | |
| 2008/0072797 A1 | 3/2008 | Utagaki et al. | |
| 2008/0148999 A1 | 6/2008 | Luo et al. | |
| 2008/0157428 A1 | 7/2008 | Utagaki et al. | |
| 2008/0178771 A1 | 7/2008 | Utagaki et al. | |
| 2008/0191165 A1 | 8/2008 | Nakagawa et al. | |
| 2008/0203365 A1 | 8/2008 | Gleeson et al. | |

FOREIGN PATENT DOCUMENTS

| | | |
|---|---|---|
| JP | 49-045934 | 5/1974 |
| JP | 49-045935 | 5/1974 |
| JP | 54-99131 | 8/1979 |
| JP | 58-110443 | 7/1983 |
| JP | 61-256956 | 11/1986 |
| JP | 01-242452 | 9/1989 |
| JP | 01-320243 | 12/1989 |
| JP | 03-097644 | 4/1991 |
| JP | 03-257052 | 11/1991 |

(Continued)

OTHER PUBLICATIONS

Apr. 12, 2007 International Preliminary Report on Patentability corresponding to International application No. PCT/JP2005/015667.

*Primary Examiner*—Paul Marcantoni
(74) *Attorney, Agent, or Firm*—Cooper & Dunham LLP

(57) ABSTRACT

The object of the present invention is to provide an inorganic board whose dimensional stability, anti-freezing and fusing properties, and the like are much improved.

To attain this object, an inorganic board is manufactured using a method comprising: preparing a raw material slurry by the dispersing of a cementitious material, silica-containing material, woody reinforcement, and mica in water, forming a papered mat by sheet forming the raw material slurry, pressing the papered mat, and curing the pressed papered mat in an autoclave at a temperature higher than 150° C., wherein the mass ratio of the cementitious inorganic material and silica-containing material is set to be in the range of between 35:65 and 45:55, to promote the curing reaction of the inorganic board and improve its dimensional stability and anti-freezing and fusing properties.

6 Claims, No Drawings

FOREIGN PATENT DOCUMENTS

| | | |
|---|---|---|
| JP | 04-042875 | 2/1992 |
| JP | 04-114937 | 4/1992 |
| JP | 04-160045 | 6/1992 |
| JP | 4-187552 | 7/1992 |
| JP | 04-193748 | 7/1992 |
| JP | 04-295072 | 10/1992 |
| JP | 04-305041 | 10/1992 |
| JP | 05-124845 | 5/1993 |
| JP | 05-229859 | 9/1993 |
| JP | 06-032643 | 2/1994 |
| JP | 06-056496 | 3/1994 |
| JP | 06-321602 | 11/1994 |
| JP | 06-329457 | 11/1994 |
| JP | 07-117027 | 5/1995 |
| JP | 07-291707 | 11/1995 |
| JP | 07-291763 | 11/1995 |
| JP | 08-040758 | 2/1996 |
| JP | 09-087001 | 3/1997 |
| JP | 10-231161 | 9/1998 |
| JP | 11-322395 | 11/1999 |
| JP | 2000-264701 | 9/2000 |
| JP | 2001-158678 | 6/2001 |
| JP | 2001-233653 | 8/2001 |
| JP | 2001-287980 | 10/2001 |
| JP | 2002-166406 | 6/2002 |
| JP | 2003-146731 | 5/2003 |
| JP | 2004-196601 | 7/2004 |

\* cited by examiner

INORGANIC BOARD AND A METHOD FOR THE MANUFACTURING THEREOF

FIELD OF THE INVENTION

The present invention relates to an inorganic board containing mica, and a method for the manufacturing thereof.

BACKGROUND OF THE INVENTION

Hitherto, asbestos has been used as a reinforcement in inorganic board, but the environmental pollution caused by the scattering of fine asbestos powder has become a serious problem, so that at present, woody reinforcements such as wood flake, wood fiber and the like are being used instead of asbestos. Nevertheless, there is a problem in that inorganic board using such materials for woody reinforcement has poor dimensional stability, so that when said inorganic board absorbs or discharges moisture, said inorganic board elongates or contracts, resulting in the warping, and further, cracking of said inorganic board.

To solve said problem, an idea wherein mica is added to the mixture of woody reinforcements and cement is proposed. Mica has a high elasticity, so that dimensional stability, cutting workability, nailing workability and the like are much improved by the added mica content in said inorganic board (See, for example, Patent literatures 1, 2, and 3).

References Cited 1:
Published unexamined Japanese Patent Application 2002-166406
References Cited 2:
Published unexamined Japanese Patent Application Heisei 06-329457
References Cited 3:
Published unexamined Japanese Patent Application Heisei 05-124845

DISCLOSURE OF THE INVENTION

The Problems to be Solved by the Invention

As described above, the dimensional stability of said inorganic board is improved by adding mica, but when a large amount of mica is added to the raw material mixture, uniform mixing of the raw-material mixture becomes difficult, so that an inorganic board having a stable quality becomes difficult to manufacture, with the additional problem that the cost of said raw materials adds up.

Accordingly, the object of the present invention is to provide an inorganic board having an excellent dimensional stability, and anti-freezing and fusing properties even with a limited amount of mica being contained in said inorganic board.

Means to Attain the Object

To attain said object, the present invention provides an inorganic board consisting of a cured raw material mixture containing a cementitious inorganic material, a silica-containing material, a woody reinforcement, and mica, wherein the mass ratio of said cementitious inorganic material and said silica-containing material in said mixture is set to be in the range of between 35:65 and 45:55, and further provides a method for the manufacturing of an inorganic board comprising: preparing a raw material slurry by the dispersing of a cementitious inorganic material, a silica-containing material, a woody reinforcement, and mica in water, forming a papered mat by sheet forming said raw material slurry, pressing said papered mat, and curing said pressed papered mat in an autoclave at a temperature higher than 150° C., wherein the mass ratio of said cementitious inorganic material and silica-containing material is set to be in the range of between 35:65 and 45:55.

The average particle size of said mica used in said raw material mixture is preferably in the range of between 200 and 700 μm, with the aspect ratio of said mica being in the range of between 60 and 100, and the content of said mica being set to be in the range of between 2 and 7% by mass, and further, the amount of CSF in said woody reinforcement used in said raw material mixture is preferably below 500 ml, the content of said woody reinforcement being set to be in the range of between 5 and 10% by mass, and further, said raw material mixture preferably contains a cementitious inorganic material, a silica-containing material, a woody reinforcement, mica, and further, a water soluble resin, and in this case, said water soluble resin used in said raw material mixture is preferably a powdered polyvinylalcohol (PVA) having a saponification value higher than 98% by mol, the content of said polyvinylalcohol (PVA) in said raw material mixture being set to be in the range of between of 0.25 and 1.25% by mass.

Effect of the Invention

In the present invention, since the mass ratio of said cementitious inorganic material and said silica-containing material is set to be in the range of between 35:65 and 45:55 to promote the curing reaction of said inorganic board, even when the content of mica in the raw material mixture is reduced to easily mix raw materials uniformly, the dimensional stability of the resulting inorganic board is much improved, and further anti-freezing and fusing properties of said inorganic board is also improved.

PREFERRED EMBODIMENT TO PRACTICE THE INVENTION

The present invention is described in detail.

[Woody Reinforcement]

The woody reinforcement used in the present invention is such as a wood flour, wood wool, wood flake, wood fiber, woody pulp, wood fiber bundle, strand, pulp made from conifer, broadleaf tree, recycled paper and the like, and two or more kinds of said woody reinforcement may be mixed together, and further, a material containing lignocellulose as its main component such as bamboo fibers hemp fiber, bagasse, chaff, rice straw, or the like may be mixed into said woody reinforcement.

A desirable woody reinforcement is coniferous unbleached pulp (NUKP) or coniferous bleached pulp (NBKP), having a C. S. F (Canadian Standard Freeness) below 500 ml.

[Cementitious Inorganic Material]

The cementitious inorganic material used in the present invention is such as portland cement, blast furnace slug cement, silica cement, flyash cement, alumina cement and the like.

[Silica-Containing Material]

In the present invention, silica-containing material is used together with said cementitious inorganic material to promote the curing reaction of said cementitious inorganic material. Said silica-containing material is such as silica powder, silica sand, silica stone powder, water glass, silica fume, shirasu balloon, pearlite, diatomaceous earth, dolomite, and the like.

[Mica]

The mica used in the present invention has preferably an average particle size in the range of between 200 and 700 μm and an aspect ratio in the range of between 60 and 100 in flake shape. Said mica generally has a layer structure, and no moisture absorption, and further said mica is a highly elastic material having rigidity, and can much improve the dimensional stability of wood cement board.

[Water Soluble Resin]

Besides said cementitious inorganic material, silica-containing material, and woody reinforcement, water soluble resin is preferably contained in the raw material mixture of the present invention. Said water soluble resin is such as a polyvinyl alcohol (PVA), carboxymethyl cellulose (CMC), methyl cellulose (MC), ethylhydroxyethyl cellulose (EHEC), polyethylene oxide (PEO), polyvinyl ether (PVE), starch, starch derivatives, gelatin, casein, albumin, soybean protein, gum Arabic, gum tragacanth, and the like. Said water soluble resin acts as an adhesive in the inner structure of said inorganic board to improve the inter-laminar adhesive properties, and so ultimately the strength of the board, and to further improve the anti-freezing and fusing properties of the board. Further, since said water soluble resin has water retention characteristics, in a case where the board is cured in an autoclave, said water soluble resin prevents the drying of the surface of the board, wholly equalizing the water content in the board, so that the curing reaction of the board proceeds uniformly without any unevenness during the curing in the autoclave.

Accordingly, in a case where said water soluble resin is added to said raw material mixture, the strength of said board is improved, with various other further properties of said board, such as anti-freezing and fusing properties being improved.

A desirable water soluble resin is a powdered polyvinyl alcohol having a saponification value higher than 98% by mol. Said powdered polyvinyl alcohol having said saponification value higher than 98% by mol swells but is insoluble in water at room temperature, therefore, said polyvinyl alcohol does not dissolve in said raw material slurry at room temperature, so that its outflow of said polyvinyl alcohol during the sheet forming process gets less, meaning a decline in the yield of said polyvinyl alcohol as well as a rise in the viscosity of said slurry being prevented, and as a result the sheet forming efficiency, namely filtration efficiency does not decline.

Said powdered polyvinyl alcohol is dissolved in the water contained in said papered sheet by heating during said autoclave curing process, but since said papered sheet has little water content, said powdered polyvinyl alcohol mostly remains in said inorganic board in a type of balloon state in which water is absorbed, so that said polyvinyl alcohol mostly remains in balloon state within the inner structure of the resulting product, therefore, the cushioning properties given to the inner structure of said board by the balloon shape effect of said polyvinyl alcohol both absorbs and relaxes the internal stress produced by freezing, much improving its anti-freezing and fusing properties.

Further, in a case where said water soluble resin is added to the raw material mixture, there is a possibility that said water soluble resin will cover the surface of the cement particles as a protective colloid, effecting the curing reaction of the cement. Nevertheless, since said polyvinyl alcohol mostly remains in balloon state in said papered sheet, said balloon shaped polyvinyl alcohol have difficulty covering said cement particles as a protective colloid, and as a result, said polyvinyl alcohol has little effect on the curing of said cement.

[Other Components]

As the raw materials for said inorganic board of the present invention, aside from the aforementioned components, an inorganic fiber such as sepiolite, wollastonite, glass fiber, whisker, and the like; a cement curing promoter such as calcium chloride, magnesium chloride, potassium sulfate, calcium sulfate, magnesium sulfate, aluminum sulfate, sodium aluminate, potassium aluminate, calcium formate, calcium acetate, calcium acrylate, water glass, and the like; a mineral powder such as vermiculite, bentonite, and the like; a water proofing agent or water repellent agent such as wax, paraffin, silicone, surfactant, and the like; and expandable plastics beads, or plastic foam, and the like may be added to the raw material mixture.

The scope of the present invention is not limited by the above described illustration.

[Composition of the Inorganic Board]

In said raw material mixture, mass ratio of said cementitious inorganic material (C) and said silica-containing material (S), (C:S) is preferably set to be in the range of between 35:65 and 45:55, to promote the curing reaction of said cementitious inorganic material.

Further, in said raw material mixture, the woody reinforcement content is preferably set to be in the range of between 5 and 10% by mass, with the cementitious inorganic material (C) content preferably being set to be in the range of between 25 and 45% by mass, the silica-containing material (S) content preferably being set to be in the range of between 45 and 65% by mass, and the mica content preferably being set to be in the range of between 2 and 7% by mass (as solid respectively).

In a case where the mica content is below 2% by mass, the dimensional stability of the resulting inorganic board is not sufficiently improved, while in a case where the mica content is beyond 7% by mass, the uniform mixing of said raw materials becomes difficult, making it hard to manufacture stable quality inorganic board, the resulting product being expensive. Still further, water soluble resin content is preferably set to be in the range of between 0.25 and 1.25% by mass (as solid).

In a case where water soluble resin content is below 0.25% by mass, the reinforcing effect of said water soluble resin on the board is insufficient, while in a case where the water soluble resin content is above 1.25% by mass, the improvement of the board's physical properties is insufficient even if the C/S is set to be in the range of between 35/65 and 45/55.

[Manufacture of the Inorganic Board]

Said inorganic board of the present invention is manufactured by the sheet forming method.

In said sheet forming method, said raw material mixture containing said cementitious inorganic material (C), silica-containing material (S), woody reinforcement, mica, and if necessary, said water soluble resin, is dispersed and mixed in water to prepare a raw material slurry, after which a papered mat is made with said raw material slurry, by the well known method such as flow-on method, wire screen method, or Hatscheck method, and the like, after which the resulting papered mat is cured in an autoclave, being pressed at a pressure desirably higher than 20 MPa, and desirably at a temperature higher than 150° C., and a pressure higher than 0.4 MPa.

In this case, the solid content of said slurry is generally set to be in the range of between 5 and 15% by mass, and a papered mat is commonly produced by taking up the papered sheet formed by the sheet forming on a making roll, to form 6 to 15 layer structure.

In the manufacturing process of said inorganic board, when said papered mat is formed by the sheet forming of said raw material slurry, and in a case where thin flake shaped mica having an aspect ratio in the range of between 60 and 100 or more is used, said mica is easily orientated along the sheet forming direction.

When said board is cured in an autoclave at a temperature higher than 150° C., and at a pressure desirably higher than 0.4 MPa, in the presence of large amount of the water, silica acid and alumina components dissolve out of the surface of the mica, making the surface of said mica rough. Further, in a case where said mica has a particle size in the range of between 200 and 700 μm or more and a large surface area, the contact area between mica particles increases As described above, since the surface of said mica is roughened by curing in an autoclave at a temperature higher than 150° C. in the presence of large amount of water, the calcium component which dissolves out of said cementitious inorganic material can easily be put between the mica particles in the area in which the mica particles contact each other in the presence of large amount of water, reacting with the silic acid and a little alumina components dissolving out of the surface of said mica, producing a stable cured material by said calcium silicate reaction, said cured material bonding said mica together and as a result, said mica is strongly bonded together by said cured material, since the area of contact between mica particles is large, as described above.

As described above, from the point of the raw materials' mixing workability, the mica content in said raw material mixture is desirably limited to less than 7% by mass, and in the present invention, the mass ratio of said cementitious inorganic material (C) and said silica-containing material (S) is set to be in the range of between 35:65 and 45:55, to achieve sufficiently the improving effect of mica on the dimensional stability even when such a small amount of mica is added.

Further, by setting the mass ratio of said cementitious inorganic material (C) and said silica-containing material (s) in the range of between 35:65 and 45:55, the strength and anti-freezing and fusing properties of said inorganic board is improved, so that even in a case where said water soluble resin is added to said raw material mixture besides mica, the effect of said water soluble resin on the curing of the board can be suppressed.

In the range described above, the curing reaction of said inorganic board proceeds smoothly, and the amounts of unreacted C component and unreacted S component much reduce, to produce a large amount of curd house state tobermorite crystal, resulting in the positive effect that mica has improving the dimensional stability, with anti-freezing and fusing properties of the board being also improved. As a result, said inorganic board acquires a high mechanical strength, much improved dimensional stability and anti-freezing and fusing properties.

In a case where the C/S<35/65, the amount of unreacted S component may increase, resulting in a reduced amount of tobermorite crystal being produced, and poor anti-freezing and fusing properties, and in a case where the C/S>45/55, the amount of cementitious hydrate which is not cured material produced by the calcium silicate reaction increases, resulting in the board becoming brittle, and having poor anti cracking properties.

Further, since the surface of mica becomes rough as described above, even if a lot of mica exists in the surface of said woody cement board, in a case where the surface of said inorganic board is coated, the resulting film coating adheres well to the surface of said inorganic board, mica not being an obstacle.

For the surface coating of said inorganic board of the present invention which is manufactured as described above, an under coating paint such as an organic solvent type acrylic resin paint, water-based emulsion type acrylic resin paint, urethane group resin paint, or silicon group resin paint, and the like is first applied to the surface of said inorganic board, after which, if desired, a middle coating paint similar to said under coating paint is applied to under coat, following which a paint for top coating such as an organic solvent type acrylic resin paint, water-based emulsion type acrylic resin paint, or organic solvent type silicon group-acrylic resin paint, and the like, is applied to the resulting middle coat.

The present invention is more concretely described by the following EXAMPLES, but the scope of the present invention is not limited by said EXAMPLES.

EXAMPLES 1 TO 5, COMPARISONS 1 TO 5

The raw material mixtures for the inorganic board, having compositions as shown in Table 1, were prepared.

TABLE 1

| Combination (% by mass) | Example 1 | Example 2 | Example 3 | Example 4 | Example 5 |
|---|---|---|---|---|---|
| Cement (C) | 39 | 34 | 29 | 39 | 29 |
| Silica sand (S) | 48 | 51 | 54 | 48 | 54 |
| Mica | 3 | 5 | 7 | 3 | 7 |
| Pulp | 5 | 5 | 5 | 5 | 5 |
| Wollastonite | 5 | 5 | 5 | 5 | 5 |
| Poly(vinyl alcohol) powder *1 | 0.3 | 0.75 | 1.2 | 1.2 | 0.3 |
| Mass ratio of C/S | 45/55 | 40/60 | 35/65 | 45/55 | 35/65 |

| Combination (% by mass) | Example 6 | Example 7 | Example 8 | Example 9 |
|---|---|---|---|---|
| Cement (C) | 37.5 | 30.5 | 35 | 35 |
| Silica sand (S) | 45.5 | 56.5 | 53 | 52 |
| Mica | 7 | 3 | 5 | 7 |
| Pulp | 5 | 5 | 7 | 6 |
| Wollastonite | 5 | 5 | 0 | 0 |
| Poly(vinyl alcohol) powder *1 | 1.2 | 0.3 | 0.75 | 0.75 |
| Mass ratio of C/S | 45/55 | 35/65 | 40/60 | 40/60 |

| Combination (% by mass) | Comparison 1 | Comparison 2 | Comparison 3 | Comparison 4 | Comparison 5 |
|---|---|---|---|---|---|
| Cement (C) | 54 | 36 | 51 | 47 | 31 |
| Silica sand (S) | 36 | 54 | 34 | 31 | 47 |
| Mica | 0 | 0 | 5 | 12 | 12 |
| Pulp | 5 | 5 | 5 | 5 | 5 |
| Wollastonite | 5 | 5 | 5 | 5 | 5 |
| Poly(vinyl alcohol) powder *1 | 0 | 0 | 0.75 | 1.5 | 1.5 |
| Mass ratio of C/S | 60/40 | 40/60 | 60/40 | 60/40 | 40/60 |

*1: Saponification value 98% by mol, extraadditive

Said prepared raw material mixtures were respectively dispersed in water to prepare a raw material slurry having a solid content of 10% by mass, then each of said prepared raw material slurry was poured onto a felt sheet to form a papered mat by sheet forming, after which the resulting papered mat was pressed at 23 MPa, precured at 50° C. for 24 hours, and then cured at 170° C., 0.7 MPa for 7 hours in an autoclave to manufacture inorganic board samples.

As for each inorganic board sample, tests on their specific gravity in absolute dry condition, bending strength, elongation ratio in a water absorbing state, contraction ratio after discharging moisture, microcracking, and anti-freezing and fusing properties were carried out. The results of said tests are shown in Table 2.

TABLE 2

|  | Example 1 | Example 2 | Example 3 | Example 4 | Example 5 |
| --- | --- | --- | --- | --- | --- |
| Specific gravity in absolute dry condition | 1.46 | 1.41 | 1.37 | 1.42 | 1.37 |
| Bending strength (N/mm$^2$) *1 | 22 | 19 | 18 | 20 | 17 |
| Elongation ratio in a water absorbing state (%) *2 | 0.16 | 0.13 | 0.11 | 0.16 | 0.11 |
| Contraction ratio after discharging moisture (%) *3 | 0.15 | 0.12 | 0.10 | 0.15 | 0.10 |
| Microcracking test *4 | 7 | 9 | 12 | 7 | 12 |
| Anti-freezing and fusing properties *5 | 2.1 | 1.3 | 1.0 | 0.7 | 2.8 |

|  | Example 6 | Example 7 | Example 8 | Example 9 |
| --- | --- | --- | --- | --- |
| Specific gravity in absolute dry condition | 1.37 | 1.41 | 1.41 | 1.41 |
| Bending strength (N/mm$^2$) *1 | 18 | 20 | 21 | 18 |
| Elongation ratio in a water absorbing state (%) *2 | 0.12 | 0.15 | 0.14 | 0.12 |
| Contraction ratio after discharging moisture (%) *3 | 0.12 | 0.14 | 0.13 | 0.12 |
| Microcracking test *4 | 10 | 9 | 9 | 12 |
| Anti-freezing and fusing properties *5 | 0.8 | 2.3 | 1.5 | 1.6 |

|  | Comparison 1 | Comparison 2 | Comparison 3 | Comparison 4 | Comparison 5 |
| --- | --- | --- | --- | --- | --- |
| Specific gravity in absolute dry condition | 1.58 | 1.54 | 1.45 | 1.33 | 1.30 |
| Bending strength (N/mm$^2$) *1 | 28 | 25 | 19 | 16 | 14 |
| Elongation ratio in a water absorbing state (%) *2 | 0.19 | 0.18 | 0.14 | 0.08 | 0.08 |
| Contraction ratio after discharging moisture (%) *3 | 0.18 | 0.18 | 0.13 | 0.07 | 0.06 |
| Microcracking test *4 | 1 | 4 | 4 | 7 | 11 |
| Anti-freezing and fusing properties *5 | 1.7 | 3.5 | 1.0 | 1.5 | 2.2 |

*1: Conform to JIS A 1408.
*2: After regulation 3 days at 60° C., steep in water for 8 days.
*3: After regulation 10 days at 20° C. 60% RH, dry 10 days at 80° C.
*4: After neutralizing for 4 days, to absorb water for 7 hours and to be dried for 17 hours at 120° C., 3 times (one cycle), and examined for at which cycle cracking occurs.
*5: ASTM B method, sample plate 300 cycles, thickness swelling ratio.

It is clear by referring to Table 2 that in each sample from EXAMPLES 1 to 5, the mass ratio of the C/S is set to be in the range of between 35:65 and 45:55, so that satisfactory results were obtained on the strength, dimensional stability, and anti-freezing and fusing properties of each sample, while the samples from COMPARISONS 1 and 2 have poor dimensional stability, each being apt to crack.

Further, a sample from COMPARISON 3 contains mica in an amount of below 2% by mass with a C/S=6/4 (C component excess), said sample having slightly poor dimensional stability, a likelihood of cracking, and poor anti-freezing and fusing properties, while a sample from COMPARISON 4, containing 7% by mass of mica and a C/S=6/4(C component excess), has good dimensional stability, though cracking is apt to occur, and has poor anti-freezing and fusing properties. Further, a sample from COMPARISON 5, containing an excess amount of mica (12% by mass), has an uneven structure and poor strength.

EXAMPLES 6 TO 15, COMPARISONS 6 TO 9

Raw material mixtures for the inorganic board, having compositions as shown in Table 3 were prepared.

TABLE 3

| Combination (% by mass) | Example 10 | Example 11 | Example 12 | Example 13 | Example 14 |
| --- | --- | --- | --- | --- | --- |
| Cement (C) | 39 | 34 | 29 | 39 | 29 |
| Silica sand (S) | 48 | 51 | 54 | 48 | 54 |
| Mica | 3 | 5 | 7 | 3 | 7 |
| Pulp | 5 | 5 | 5 | 5 | 5 |
| Wollastonite | 5 | 5 | 5 | 5 | 5 |
| Poly(vinyl alcohol) powder *1 | 0.3 | 0.75 | 1.2 | 1.2 | 0.3 |
| Mass ratio of C/S | 45/55 | 40/60 | 35/65 | 45/55 | 35/65 |

TABLE 3-continued

| Combination (% by mass) | Example 15 | Example 16 | Example 17 | Example 18 | Example 19 |
|---|---|---|---|---|---|
| Cement (C) | 37.5 | 30.5 | 35 | 35 | 31 |
| Silica sand (S) | 45.5 | 56.5 | 53 | 52 | 47 |
| Mica | 7 | 3 | 5 | 7 | 12 |
| Pulp | 5 | 5 | 7 | 6 | 5 |
| Wollastonite | 5 | 5 | 0 | 0 | 5 |
| Poly(vinyl alcohol) powder *1 | 1.2 | 0.3 | 0.75 | 0.75 | 1.5 |
| Mass ratio of C/S | 45/55 | 35/65 | 40/60 | 40/60 | 40/60 |

| Combination (% by mass) | Comparison 6 | Comparison 7 | Comparison 8 | Comparison 9 |
|---|---|---|---|---|
| Cement (C) | 54 | 36 | 51 | 47 |
| Silica sand (S) | 36 | 54 | 34 | 31 |
| Mica | 0 | 0 | 5 | 12 |
| Pulp | 5 | 5 | 5 | 5 |
| Wollastonite | 5 | 5 | 5 | 5 |
| Poly(vinyl alcohol) powder *1 | 0 | 0 | 0.75 | 1.5 |
| Mass ratio of C/S | 0/40 | 40/60 | 60/40 | 60/40 |

*1: Saponification value 98% by mol, extraadditive

Said prepared raw material mixtures were respectively dispersed in water to prepare a raw material slurry having a solid content of 10% by mass, then each of said prepared raw material slurry was poured onto a felt sheet to form a papered mat by sheet forming, after which the resulting papered mat was pressed at 23 MPa, precured at 50° C. for 24 hours, and then cured at 170° C., 0.7 MPa for 7 hours in an autoclave to manufacture inorganic board samples.

As for each inorganic board sample, tests on their specific gravity in absolute dry condition, bending strength, elongation ratio in a water absorbing state, contraction ratio after discharging moisture, microcracking, and anti-freezing and fusing properties were carried out.

The results of said tests are shown in Table 2.
The results of said tests are shown in Table 4.

TABLE 4

| | Example 10 | Example 11 | Example 12 | Example 13 | Example 14 |
|---|---|---|---|---|---|
| Specific gravity in absolute dry condition | 1.46 | 1.41 | 1.37 | 1.42 | 1.37 |
| Bending strength (N/mm$^2$) *1 | 22 | 19 | 18 | 20 | 17 |
| Elongation ratio in a water absorbing state (%) *2 | 0.16 | 0.13 | 0.11 | 0.16 | 0.11 |
| Contraction ratio after discharging moisture (%) *3 | 0.15 | 0.12 | 0.10 | 0.15 | 0.10 |
| Microcracking test *4 | 7 | 9 | 12 | 7 | 12 |
| Anti-freezing and fusing properties *5 | 2.1 | 1.3 | 1.0 | 0.7 | 2.8 |

| | Example 15 | Example 16 | Example 17 | Example 18 | Example 19 |
|---|---|---|---|---|---|
| Specific gravity in absolute dry condition | 1.37 | 1.41 | 1.41 | 1.41 | 1.30 |
| Bending strength (N/mm$^2$) *1 | 18 | 20 | 21 | 18 | 14 |
| Elongation ratio in a water absorbing state (%) *2 | 0.12 | 0.15 | 0.14 | 0.12 | 0.08 |
| Contraction ratio after discharging moisture (%) *3 | 0.12 | 0.14 | 0.13 | 0.12 | 0.06 |
| Microcracking test *4 | 10 | 9 | 9 | 12 | 11 |
| Anti-freezing and fusing properties *5 | 0.8 | 2.3 | 1.5 | 1.6 | 2.2 |

| | Comparison 6 | Comparison 7 | Comparison 8 | Comparison 9 |
|---|---|---|---|---|
| Specific gravity in absolute dry condition | 1.58 | 1.54 | 1.45 | 1.33 |
| Bending strength (N/mm$^2$) *1 | 28 | 25 | 19 | 16 |
| Elongation ratio in a water absorbing state (%) *2 | 0.19 | 0.18 | 0.14 | 0.08 |
| Contraction ratio after discharging moisture (%) *3 | 0.18 | 0.18 | 0.13 | 0.07 |
| Microcracking test *4 | 1 | 4 | 4 | 7 |
| Anti-freezing and fusing properties *5 | 1.7 | 3.5 | 1.0 | 1.5 |

*1: Conform to JIS A 1408.
*2: After regulation 3 days at 60° C., steep in water for 8 days.
*3: After regulation 10 days at 20° C. 60% RH, dry 10 days at 80° C.
*4: After neutralizing for 4 days, to absorb water for 7 hours and to be dried for 17 hours at 120° C., 3 times (one cycle), and examined for at which cycle cracking occurs.
*5: ASTM B method, sample plate 300 cycles, thickness swelling ratio.

It is clear referring to Table 4 that in each of the samples from EXAMPLES 6 to 15, the mass ratio of C/S is set to be in the range of between 35:65 and 45:55, so that satisfactory results were obtained regarding strength, dimensional stability, anti-freezing and fusing properties, and anti-cracking properties.

Further, samples from EXAMPLES 9 to 18 have improved anti-freezing and fusing properties as compared with the samples from COMPARISONS 6 to 9. Furthermore, the sample from EXAMPLE 19, with a C/S being in the range of between 35/65 and 45/55, containing mica in an amount of beyond 7% by mass (12% by mass), and PVA powder in an amount of beyond 1.25% by mass (1.5% by mass), has decreased bending strength, as compared with samples from EXAMPLES 9 to 18.

Accordingly, desirable results were obtained on the samples containing mica in an amount of below 7% by mass and water soluble resin in an amount of below 1.25% by mass.

On the other hand, the sample from COMPARISON 6 containing no mica and no PVA powder and C/S>45/55(60/40) has a poor dimensional stability and poor anti-cracking properties, while the sample from COMPARISON 7, containing no PVA powder and no mica, also has a poor dimensional stability and poor anti cracking properties, the same as with the sample from COMPARISON 6, even though the C/S of said sample is set to be in the range of between 35/65 and 45/55(60/40).

The sample from COMPARISON 8, containing 5% by mass of mica and 0.75% by mass of PVA powder, is brittle and has poor anti cracking properties since the C/S>45/55(60/40), while the sample from COMPARISON 9, containing mica in an amount of beyond 7% by mass (12% by mass), and PVA powder in an amount of beyond 1.25% by mass (1.5% by mass), with a C/S>45/55(60/40), has slightly poor bending strength, is brittle, and has poor anti-cracking properties.

POSSIBILITY OF INDUSTRIAL USE

Said inorganic board of the present invention has excellent dimension stability and anti-freezing and fusing properties, so that said inorganic board is very useful as a building board, used for such as siding board.

The invention claimed is:

1. An inorganic board consisting of a cured raw material mixture containing portland cement, a silica-containing material, a woody reinforcement, mica, and a powdered polyvinyl alcohol having a saponification value higher than 98% by mol, wherein the mass ratio of said portland cement and said silica-containing material in said mixture is set to be in the range of between 35:65 and 45:55, and the content of said polyvinyl alcohol in said raw material mixture is set to be in the range of between 0.25 and 1.25% by mass.

2. An inorganic board in accordance with claim 1, wherein the average particle size of said mica used in said raw material mixture is in the range of between 200 and 700 μm, with the aspect ratio of said mica being in the range of between 60 and 100, and the content of said mica being set to be in the range of between 2 and 7% by mass.

3. An inorganic board in accordance with claim 1, wherein the amount of Canadian Standard Freeness in said woody reinforcement used in said raw material mixture is below 500 ml, the content of said woody reinforcement being set to be in the range of between 5 and 10% by mass.

4. A method for manufacturing an inorganic board comprising: preparing a raw material slurry by the dispersing of a portland cement, a silica-containing material, a woody reinforcement, mica and a powdered polyvinyl alcohol having a saponification value higher than 98% by mol in water, forming a papered mat by sheet forming said raw material slurry, pressing said papered mat, and curing said pressed papered mat in an autoclave at a temperature higher than 150° C., wherein the mass ratio of said portland cement and silica-containing material is set to be in the range of between 35:65 and 45:55, and the content of said polyvinyl alcohol in said raw material mixture is set to be in the range of between 0.25 and 1.25% by mass.

5. A method for manufacturing an inorganic board in accordance with claim 4, wherein the average particle size of said mica used in said raw material slurry is in the range of between 200 and 700 μm, with the aspect ratio of said mica being in the range of between 60 and 100, and the content of said mica in said raw material slurry being set to be in the range of between 2 and 7% by mass.

6. A method for manufacturing an inorganic board in accordance with claim 4, wherein the amount of Canadian Standard Freeness in said woody reinforcement is below 500 ml, the content of said woody reinforcement being set to be in the range of between 5 and 10% by mass.

* * * * *